L. RISK.
VULCANIZER.
APPLICATION FILED JULY 15, 1916.
1,260,580.
Patented Mar. 26, 1918.
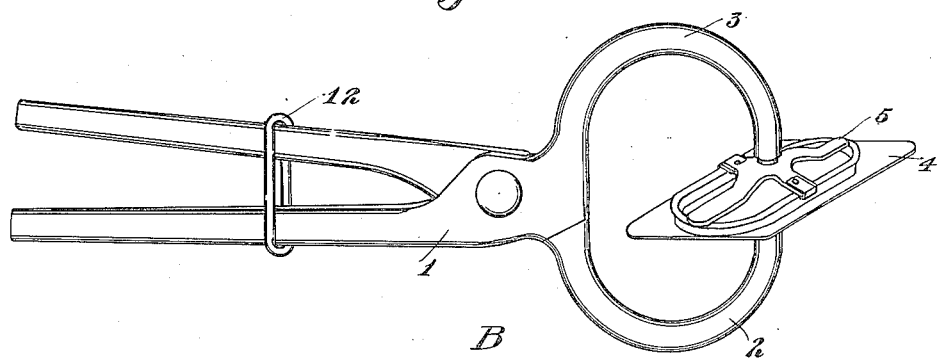
Fig. 1
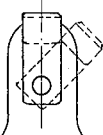
Fig. 2
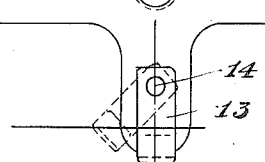
Fig. 3      Fig. 4
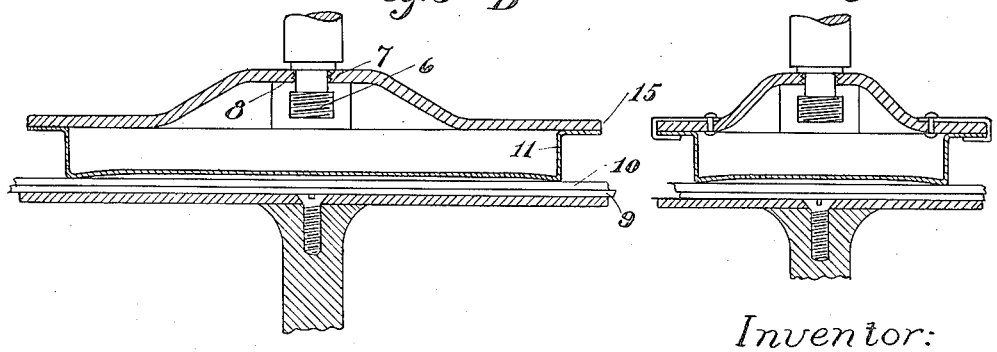
Inventor:
Loren Risk
by C. B. Enochs
Attorney.

UNITED STATES PATENT OFFICE.

LOREN RISK, OF MINNEAPOLIS, MINNESOTA.

VULCANIZER.

1,260,580.

Specification of Letters Patent. Patented Mar. 26, 1918.

Application filed July 15, 1916. Serial No. 109,565.

*To all whom it may concern:*

Be it known that I, LOREN RISK, a citizen of the United States, residing at Minneapolis, county of Hennepin, and State of Minnesota, have invented new and useful Improvements in Vulcanizers, of which the following is a specification.

One object of my invention is to provide clamping means for holding a patch on an article, to which it is to be vulcanized by tong pressure.

Another object of my invention is to provide with a pair of tongs, means for pressing onto a patch to be vulcanized, a heating pan.

Another object of my invention is to provide means for gripping a heating pan used therewith.

Another object of my invention is to provide self-seating clamping members to hold the heating pan.

Another object of my invention is to provide with a pair of tongs having U shaped jaws, self adjusting clamping means for holding a patch to be vulcanized.

With these and incidental objects in view, the invention consists of certain novel features of construction and combination of parts, the essential elements of which are hereinafter described with reference to the drawing which accompanies and forms a part of this specification.

In the drawing, Figure 1 is a perspective view of my vulcanizer.

Fig. 2 is a plan view of one of the clamping members.

Fig. 3 is a sectional view of the clamping members taken on the line A A of the member shown in Fig. 2, and Fig. 4 is a sectional view of the clamping member taken on the line B B of the member shown in Fig. 2.

In my preferred construction, I combine with a pair of tongs 1, U shaped jaws 2 and 3, a clamping plate 4, and a clamping cross 5.

The clamping plate 4 is swiveled on the end of the jaw 2 as better shown in Figs. 3 and 4, and the cross 5 is swiveled on the end of the jaw 3 as also plainly shown in Figs. 3 and 4.

The end of the jaw 3 has a threaded portion 6, and just above the threaded portion is turned down to a smaller diameter as at 7.

The cross 5 has a threaded opening 8 at its center which is screwed onto and over the threaded portion 6 so that it rests in the turned down portion 7 thus having sufficient play on this portion to seat itself firmly on the four extremities of the cross under all working conditions.

In vulcanizing an inner tube of a bicycle or an automobile, the tube 9 would be placed on the plate 4, as shown in Fig. 3, and the patch 10 applied over the puncture, then a heating pan 11 applied over the patch and the tongs pressed so the patch would be firmly held against the tube and pressure maintained by slipping the ring 12, Fig. 1, rearwardly on the handle tong.

Spring clips 13 pivoted to the cross ends at 14 are adapted to engage with the heating pan as plainly shown in Fig. 4, and the pan may be applied to the cross before the device is clamped to the tire, or the connection may be made at that time.

The clips 13, being pivoted at 14 can be swung, as shown in the dotted position in Fig. 2, so that heating pans of various widths may be clamped to the cross.

It is also evident that plain circular cups, with straight sides, may be held clamped against the patch by this same cross without the use of the spring clip 13 which is applicable only to those heating pans having the flange 15.

The U shaped jaws of the tongs are provided so that the device may be used in repairing small punctures in outer casings as well as in inner tubes.

While I have described my invention and illustrated it in one particular design, I do not wish it understood that I limit myself to this construction, as it is evident that the application of my invention may be varied in many ways within the scope of the following claims:

Claims:

1. In a vulcanizer, the combination of a pair of tongs having U shaped jaws, a plate rotatably mounted on the end of one of said jaws and clamping means adjustably rotatably mounted on the other of said jaws.

2. In a vulcanizer, the combination of a pair of tongs having U shaped jaws, a plate rotatably mounted on one of said jaws, a cross rotatably and adjustably mounted on the other of said jaws, and means on said cross for holding a heating pan.

3. In a vulcanizer, the combination of a pair of tongs, oppositely disposed U shaped jaws in said tongs, a plate mounted on one of said jaws, adjustable rotatable clamping means mounted on the other of said jaws, spring clamps mounted on said means for holding a heating pan and means associated with the handles of said tongs for maintaining a pressure set up between the jaws of said tongs.

LOREN RISK.